(12) United States Patent
Posner et al.

(10) Patent No.: US 12,273,231 B2
(45) Date of Patent: Apr. 8, 2025

(54) PROVIDING PROTECTION IN TUNNEL-OVER-TUNNEL TOPOLOGIES

(71) Applicant: Nokia Solutions and Networks Oy, Espoo (FI)

(72) Inventors: Brandon Posner, Ottawa (CA); Nirmesh Patel, Kanata (CA)

(73) Assignee: Nokia Solutions and Networks Oy, Espoo (FI)

( * ) Notice: Subject to any disclaimer, the term of this patent is extended or adjusted under 35 U.S.C. 154(b) by 479 days.

(21) Appl. No.: 17/867,948

(22) Filed: Jul. 19, 2022

(65) Prior Publication Data
US 2024/0031218 A1 Jan. 25, 2024

(51) Int. Cl.
*H04L 41/0654* (2022.01)

(52) U.S. Cl.
CPC .................. *H04L 41/0654* (2013.01)

(58) Field of Classification Search
CPC .................................................. H04L 41/0654
See application file for complete search history.

(56) References Cited

U.S. PATENT DOCUMENTS

| 11,271,849 | B1 * | 3/2022 | Darwish | H04L 12/4633 |
| 2013/0259060 | A1 * | 10/2013 | Liu | H04L 45/00 370/401 |
| 2016/0006609 | A1 * | 1/2016 | Zhao | H04L 41/0816 370/254 |
| 2021/0144086 | A1 * | 5/2021 | Bidgoli | H04L 45/22 |

* cited by examiner

*Primary Examiner* — Michael Thier
*Assistant Examiner* — Tracy Lauren Colbert
(74) *Attorney, Agent, or Firm* — Tong, Rea, Bentley & Kim, LLC (57) ABSTRACT

Various example embodiments for providing protection in communication networks are presented herein. Various example embodiments for providing protection in communication networks may be configured to provide protection in tunnel-over-tunnel topologies supported within communication networks. Various example embodiments for providing protection in tunnel-over-tunnel topologies may be configured to provide dynamic application of protection in tunnel-over-tunnel topologies rather than static application of protection in tunnel-over-tunnel topologies. Various example embodiments for providing protection in tunnel-over-tunnel topologies may be configured to provide dynamic application of protection for a primary path that is a tunnel-over-tunnel path based on a hierarchy of protocols.

8 Claims, 4 Drawing Sheets

PROVIDING PROTECTION IN TUNNEL-OVER-TUNNEL TOPOLOGIES

TECHNICAL FIELD

Various example embodiments relate generally to communication networks and, more particularly but not exclusively, to providing protection in tunnel-over-tunnel topologies within communication networks.

BACKGROUND

In communication networks, various communications technologies may be used to support various types of communications.

SUMMARY

In at least some example embodiments, an apparatus includes at least one processor and at least one memory storing instructions that, when executed by the at least one processor, cause the apparatus at least to support a primary path using a hierarchy of protocols, wherein the hierarchy of protocols includes a first protocol and a second protocol encapsulating the first protocol, and determine application of protection for the primary path using a set of parameters that includes an indication of an availability of a given protocol for protecting the primary path, an indication of a preference to apply protection for the primary path using the given protocol, and an indication of an availability of a backup path for the primary path that is based on the given protocol. In at least some example embodiments, the determination of application of protection for the primary path using the set of parameters is performed in a manner tending to support application of protection for the primary path using the given protocol. In at least some example embodiments, the determination of application of protection for the primary path using the set of parameters is performed in a manner tending to support application of protection for the primary path using the second protocol or a third protocol of the hierarchy of protocols that encapsulates the second protocol. In at least some example embodiments, the application of protection for the primary path is determined based on a request to configure the primary path at a router. In at least some example embodiments, the application of protection for the primary path is determined based on at least one of an indication of a failure impacting the primary path, an indication of a failure impacting the backup path for the primary path, or a change in availability of the backup path for the primary path. In at least some example embodiments, the determination of the application of protection for the primary path results in a determination not to apply protection for the primary path based on a determination that the given protocol is not available for protecting the primary path. In at least some example embodiments, the determination of the application of protection for the primary path results in a determination to apply protection for the primary path using the first protocol based on an indication of a preference to apply protection using the first protocol and an indication that a backup path based on the first protocol is available. In at least some example embodiments, the determination of the application of protection for the primary path results in a determination to apply protection for the primary path using the first protocol based on an indication of a preference to apply protection using the second protocol and an indication that a backup path based on the second protocol is unavailable. In at least some example embodiments, the determination of the application of protection for the primary path results in a determination to apply protection for the primary path using the second protocol based on an indication of a preference to apply protection using the second protocol and an indication that a backup path based on the second protocol is available. In at least some example embodiments, the determination of the application of protection for the primary path results in a determination not to apply protection for the primary path based on an indication for the first protocol to defer protection to the second protocol and an indication that a backup path based on the first protocol is unavailable. In at least some example embodiments, the determination of the application of protection for the primary path results in a determination not to apply protection for the primary path based on an indication for the first protocol not to defer protection to the second protocol and an indication that a backup path based on the first protocol is unavailable. In at least some example embodiments, the determination of the application of protection for the primary path results in a determination not to apply protection for the primary path based on an indication for the first protocol not to defer protection to the second protocol, an indication for the second protocol to defer protection to a third protocol encapsulating the second protocol, and an indication that a backup path based on the first protocol is unavailable. In at least some example embodiments, the determination of the application of protection for the primary path results in a determination to apply protection for the primary path using the first protocol based on an indication for the first protocol not to defer protection to the second protocol and an indication that a backup path based on the first protocol is available. In at least some example embodiments, the determination of the application of protection for the primary path results in a determination to apply protection for the primary path using the first protocol based on an indication for the first protocol to defer protection to the second protocol, an indication that a backup path based on the second protocol is unavailable, and an indication that a backup path based on the first protocol is available. In at least some example embodiments, the determination of the application of protection for the primary path results in a determination to apply protection for the primary path using the second protocol based on an indication for the first protocol to defer protection to the second protocol and an indication that a backup path based on the second protocol is available. In at least some example embodiments, the determination of the application of protection for the primary path results in a determination to apply protection for the primary path using the second protocol based on an indication for the first protocol to defer protection to the second protocol, an indication for the second protocol to defer protection to a third protocol encapsulating the second protocol, an indication that a backup path based on the third protocol is unavailable, and an indication that a backup path based on the second protocol is available. In at least some example embodiments, the determination of the application of protection for the primary path results in a determination to apply protection for the primary path using a third protocol encapsulating the second protocol based on an indication for the first protocol to defer protection to the second protocol, an indication for the second protocol to defer protection to the third protocol, and an indication that a backup path based on the third protocol is available. In at least some example embodiments, the instructions, when executed by the at least one processor, cause the apparatus at least to configure a data path of a router to support the primary path and the backup path configured to protect the primary path. In at least some example embodiments, the instructions, when executed by the at least one processor, cause the apparatus at least to initiate a fast reroute operation to switch from use of the primary path to use of the backup path. In at least some example embodiments, the primary path is a Multiprotocol Label Switching (MPLS) tunnel-over-tunnel path based on the hierarchy of protocols.

In at least some example embodiments, a non-transitory computer readable medium includes program instructions that, when executed by an apparatus, cause the apparatus at least to support a primary path using a hierarchy of protocols, wherein the hierarchy of protocols includes a first protocol and a second protocol encapsulating the first protocol, and determine application of protection for the primary path using a set of parameters that includes an indication of an availability of a given protocol for protecting the primary path, an indication of a preference to apply protection for the primary path using the given protocol, and an indication of an availability of a backup path for the primary path that is based on the given protocol. In at least some example embodiments, the determination of application of protection for the primary path using the set of parameters is performed in a manner tending to support application of protection for the primary path using the given protocol. In at least some example embodiments, the determination of application of protection for the primary path using the set of parameters is performed in a manner tending to support application of protection for the primary path using the second protocol or a third protocol of the hierarchy of protocols that encapsulates the second protocol. In at least some example embodiments, the application of protection for the primary path is determined based on a request to configure the primary path at a router. In at least some example embodiments, the application of protection for the primary path is determined based on at least one of an indication of a failure impacting the primary path, an indication of a failure impacting the backup path for the primary path, or a change in availability of the backup path for the primary path. In at least some example embodiments, the determination of the application of protection for the primary path results in a determination not to apply protection for the primary path based on a determination that the given protocol is not available for protecting the primary path. In at least some example embodiments, the determination of the application of protection for the primary path results in a determination to apply protection for the primary path using the first protocol based on an indication of a preference to apply protection using the first protocol and an indication that a backup path based on the first protocol is available. In at least some example embodiments, the determination of the application of protection for the primary path results in a determination to apply protection for the primary path using the first protocol based on an indication of a preference to apply protection using the second protocol and an indication that a backup path based on the second protocol is unavailable. In at least some example embodiments, the determination of the application of protection for the primary path results in a determination to apply protection for the primary path using the second protocol based on an indication of a preference to apply protection using the second protocol and an indication that a backup path based on the second protocol is available. In at least some example embodiments, the determination of the application of protection for the primary path results in a determination not to apply protection for the primary path based on an indication for the first protocol to defer protection to the second protocol and an indication that a backup path based on the first protocol is unavailable. In at least some example embodiments, the determination of the application of protection for the primary path results in a determination not to apply protection for the primary path based on an indication for the first protocol not to defer protection to the second protocol and an indication that a backup path based on the first protocol is unavailable. In at least some example embodiments, the determination of the application of protection for the primary path results in a determination not to apply protection for the primary path based on an indication for the first protocol not to defer protection to the second protocol, an indication for the second protocol to defer protection to a third protocol encapsulating the second protocol, and an indication that a backup path based on the first protocol is unavailable. In at least some example embodiments, the determination of the application of protection for the primary path results in a determination to apply protection for the primary path using the first protocol based on an indication for the first protocol not to defer protection to the second protocol and an indication that a backup path based on the first protocol is available. In at least some example embodiments, the determination of the application of protection for the primary path results in a determination to apply protection for the primary path using the first protocol based on an indication for the first protocol to defer protection to the second protocol, an indication that a backup path based on the second protocol is unavailable, and an indication that a backup path based on the first protocol is available. In at least some example embodiments, the determination of the application of protection for the primary path results in a determination to apply protection for the primary path using the second protocol based on an indication for the first protocol to defer protection to the second protocol and an indication that a backup path based on the second protocol is available. In at least some example embodiments, the determination of the application of protection for the primary path results in a determination to apply protection for the primary path using the second protocol based on an indication for the first protocol to defer protection to the second protocol, an indication for the second protocol to defer protection to a third protocol encapsulating the second protocol, an indication that a backup path based on the third protocol is unavailable, and an indication that a backup path based on the second protocol is available. In at least some example embodiments, the determination of the application of protection for the primary path results in a determination to apply protection for the primary path using a third protocol encapsulating the second protocol based on an indication for the first protocol to defer protection to the second protocol, an indication for the second protocol to defer protection to the third protocol, and an indication that a backup path based on the third protocol is available. In at least some example embodiments, the non-transitory computer readable medium includes program instructions that, when executed by the apparatus, cause the apparatus at least to configure a data path of a router to support the primary path and the backup path configured to protect the primary path. In at least some example embodiments, the non-transitory computer readable medium includes program instructions that, when executed by the apparatus, cause the apparatus at least to initiate a fast reroute operation to switch from use of the primary path to use of the backup path. In at least some example embodiments, the primary path is a Multiprotocol Label Switching (MPLS) tunnel-over-tunnel path based on the hierarchy of protocols.

In at least some example embodiments, a method includes supporting a primary path using a hierarchy of protocols, wherein the hierarchy of protocols includes a first protocol and a second protocol encapsulating the first protocol, and determining application of protection for the primary path using a set of parameters that includes an indication of an availability of a given protocol for protecting the primary path, an indication of a preference to apply protection for the primary path using the given protocol, and an indication of an availability of a backup path for the primary path that is based on the given protocol. In at least some example embodiments, the determination of application of protection for the primary path using the set of parameters is performed in a manner tending to support application of protection for the primary path using the given protocol. In at least some example embodiments, the determination of application of protection for the primary path using the set of parameters is performed in a manner tending to support application of protection for the primary path using the second protocol or a third protocol of the hierarchy of protocols that encapsulates the second protocol. In at least some example embodiments, the application of protection for the primary path is determined based on a request to configure the primary path at a router. In at least some example embodiments, the application of protection for the primary path is determined based on at least one of an indication of a failure impacting the primary path, an indication of a failure impacting the backup path for the primary path, or a change in availability of the backup path for the primary path. In at least some example embodiments, the determination of the application of protection for the primary path results in a determination not to apply protection for the primary path based on a determination that the given protocol is not available for protecting the primary path. In at least some example embodiments, the determination of the application of protection for the primary path results in a determination to apply protection for the primary path using the first protocol based on an indication of a preference to apply protection using the first protocol and an indication that a backup path based on the first protocol is available. In at least some example embodiments, the determination of the application of protection for the primary path results in a determination to apply protection for the primary path using the first protocol based on an indication of a preference to apply protection using the second protocol and an indication that a backup path based on the second protocol is unavailable. In at least some example embodiments, the determination of the application of protection for the primary path results in a determination to apply protection for the primary path using the second protocol based on an indication of a preference to apply protection using the second protocol and an indication that a backup path based on the second protocol is available. In at least some example embodiments, the determination of the application of protection for the primary path results in a determination not to apply protection for the primary path based on an indication for the first protocol to defer protection to the second protocol and an indication that a backup path based on the first protocol is unavailable. In at least some example embodiments, the determination of the application of protection for the primary path results in a determination not to apply protection for the primary path based on an indication for the first protocol not to defer protection to the second protocol and an indication that a backup path based on the first protocol is unavailable. In at least some example embodiments, the determination of the application of protection for the primary path results in a determination not to apply protection for the primary path based on an indication for the first protocol not to defer protection to the second protocol, an indication for the second protocol to defer protection to a third protocol encapsulating the second protocol, and an indication that a backup path based on the first protocol is unavailable. In at least some example embodiments, the determination of the application of protection for the primary path results in a determination to apply protection for the primary path using the first protocol based on an indication for the first protocol not to defer protection to the second protocol and an indication that a backup path based on the first protocol is available. In at least some example embodiments, the determination of the application of protection for the primary path results in a determination to apply protection for the primary path using the first protocol based on an indication for the first protocol to defer protection to the second protocol, an indication that a backup path based on the second protocol is unavailable, and an indication that a backup path based on the first protocol is available. In at least some example embodiments, the determination of the application of protection for the primary path results in a determination to apply protection for the primary path using the second protocol based on an indication for the first protocol to defer protection to the second protocol and an indication that a backup path based on the second protocol is available. In at least some example embodiments, the determination of the application of protection for the primary path results in a determination to apply protection for the primary path using the second protocol based on an indication for the first protocol to defer protection to the second protocol, an indication for the second protocol to defer protection to a third protocol encapsulating the second protocol, an indication that a backup path based on the third protocol is unavailable, and an indication that a backup path based on the second protocol is available. In at least some example embodiments, the determination of the application of protection for the primary path results in a determination to apply protection for the primary path using a third protocol encapsulating the second protocol based on an indication for the first protocol to defer protection to the second protocol, an indication for the second protocol to defer protection to the third protocol, and an indication that a backup path based on the third protocol is available. In at least some example embodiments, the method includes configuring a data path of a router to support the primary path and the backup path configured to protect the primary path. In at least some example embodiments, the method includes initiating a fast reroute operation to switch from use of the primary path to use of the backup path. In at least some example embodiments, the primary path is a Multiprotocol Label Switching (MPLS) tunnel-over-tunnel path based on the hierarchy of protocols.

In at least some example embodiments, an apparatus includes means for supporting a primary path using a hierarchy of protocols, wherein the hierarchy of protocols includes a first protocol and a second protocol encapsulating the first protocol, and means for determining application of protection for the primary path using a set of parameters that includes an indication of an availability of a given protocol for protecting the primary path, an indication of a preference to apply protection for the primary path using the given protocol, and an indication of an availability of a backup path for the primary path that is based on the given protocol. In at least some example embodiments, the determination of application of protection for the primary path using the set of parameters is performed in a manner tending to support application of protection for the primary path using the given protocol. In at least some example embodiments, the determination of application of protection for the primary path using the set of parameters is performed in a manner tending to support application of protection for the primary path using the second protocol or a third protocol of the hierarchy of protocols that encapsulates the second protocol. In at least some example embodiments, the application of protection for the primary path is determined based on a request to configure the primary path at a router. In at least some example embodiments, the application of protection for the primary path is determined based on at least one of an indication of a failure impacting the primary path, an indication of a failure impacting the backup path for the primary path, or a change in availability of the backup path for the primary path. In at least some example embodiments, the determination of the application of protection for the primary path results in a determination not to apply protection for the primary path based on a determination that the given protocol is not available for protecting the primary path. In at least some example embodiments, the determination of the application of protection for the primary path results in a determination to apply protection for the primary path using the first protocol based on an indication of a preference to apply protection using the first protocol and an indication that a backup path based on the first protocol is available. In at least some example embodiments, the determination of the application of protection for the primary path results in a determination to apply protection for the primary path using the first protocol based on an indication of a preference to apply protection using the second protocol and an indication that a backup path based on the second protocol is unavailable. In at least some example embodiments, the determination of the application of protection for the primary path results in a determination to apply protection for the primary path using the second protocol based on an indication of a preference to apply protection using the second protocol and an indication that a backup path based on the second protocol is available. In at least some example embodiments, the determination of the application of protection for the primary path results in a determination not to apply protection for the primary path based on an indication for the first protocol to defer protection to the second protocol and an indication that a backup path based on the first protocol is unavailable. In at least some example embodiments, the determination of the application of protection for the primary path results in a determination not to apply protection for the primary path based on an indication for the first protocol not to defer protection to the second protocol and an indication that a backup path based on the first protocol is unavailable. In at least some example embodiments, the determination of the application of protection for the primary path results in a determination not to apply protection for the primary path based on an indication for the first protocol not to defer protection to the second protocol, an indication for the second protocol to defer protection to a third protocol encapsulating the second protocol, and an indication that a backup path based on the first protocol is unavailable. In at least some example embodiments, the determination of the application of protection for the primary path results in a determination to apply protection for the primary path using the first protocol based on an indication for the first protocol not to defer protection to the second protocol and an indication that a backup path based on the first protocol is available. In at least some example embodiments, the determination of the application of protection for the primary path results in a determination to apply protection for the primary path using the first protocol based on an indication for the first protocol to defer protection to the second protocol, an indication that a backup path based on the second protocol is unavailable, and an indication that a backup path based on the first protocol is available. In at least some example embodiments, the determination of the application of protection for the primary path results in a determination to apply protection for the primary path using the second protocol based on an indication for the first protocol to defer protection to the second protocol and an indication that a backup path based on the second protocol is available. In at least some example embodiments, the determination of the application of protection for the primary path results in a determination to apply protection for the primary path using the second protocol based on an indication for the first protocol to defer protection to the second protocol, an indication for the second protocol to defer protection to a third protocol encapsulating the second protocol, an indication that a backup path based on the third protocol is unavailable, and an indication that a backup path based on the second protocol is available. In at least some example embodiments, the determination of the application of protection for the primary path results in a determination to apply protection for the primary path using a third protocol encapsulating the second protocol based on an indication for the first protocol to defer protection to the second protocol, an indication for the second protocol to defer protection to the third protocol, and an indication that a backup path based on the third protocol is available. In at least some example embodiments, the apparatus includes means for configuring a data path of a router to support the primary path and the backup path configured to protect the primary path. In at least some example embodiments, the apparatus includes means for initiating a fast reroute operation to switch from use of the primary path to use of the backup path. In at least some example embodiments, the primary path is a Multiprotocol Label Switching (MPLS) tunnel-over-tunnel path based on the hierarchy of protocols.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for providing protection in communication networks are presented herein. Various example embodiments for providing protection in communication networks may be configured to provide protection in tunnel-over-tunnel topologies supported within communication networks. Various example embodiments for providing protection in tunnel-over-tunnel topologies may be configured to provide dynamic application of protection in tunnel-over-tunnel topologies rather than static application of protection in tunnel-over-tunnel topologies. Various example embodiments for providing protection in tunnel-over-tunnel topologies may be configured to provide dynamic application of protection for a primary path that is a tunnel-over-tunnel path based on a hierarchy of protocols. Various example embodiments for providing protection in tunnel-over-tunnel topologies may be configured to provide dynamic application of protection for a primary path that is a tunnel-over-tunnel path based on a hierarchy of protocols in a manner tending to defer protection to the lowest level protocol in the hierarchy of protocols (e.g., providing, for the primary path, a protection path that is based on the lowest level protocol in the hierarchy of protocols). Various example embodiments for providing protection in tunnel-over-tunnel topologies may be configured to support failover between primary paths and protection paths in tunnel-over-tunnel topologies. It will be appreciated that these and various other example embodiments and advantages or potential advantages of providing protection in communication networks may be further understood by way of reference to the various figures, which are discussed further below.

Figure 1:
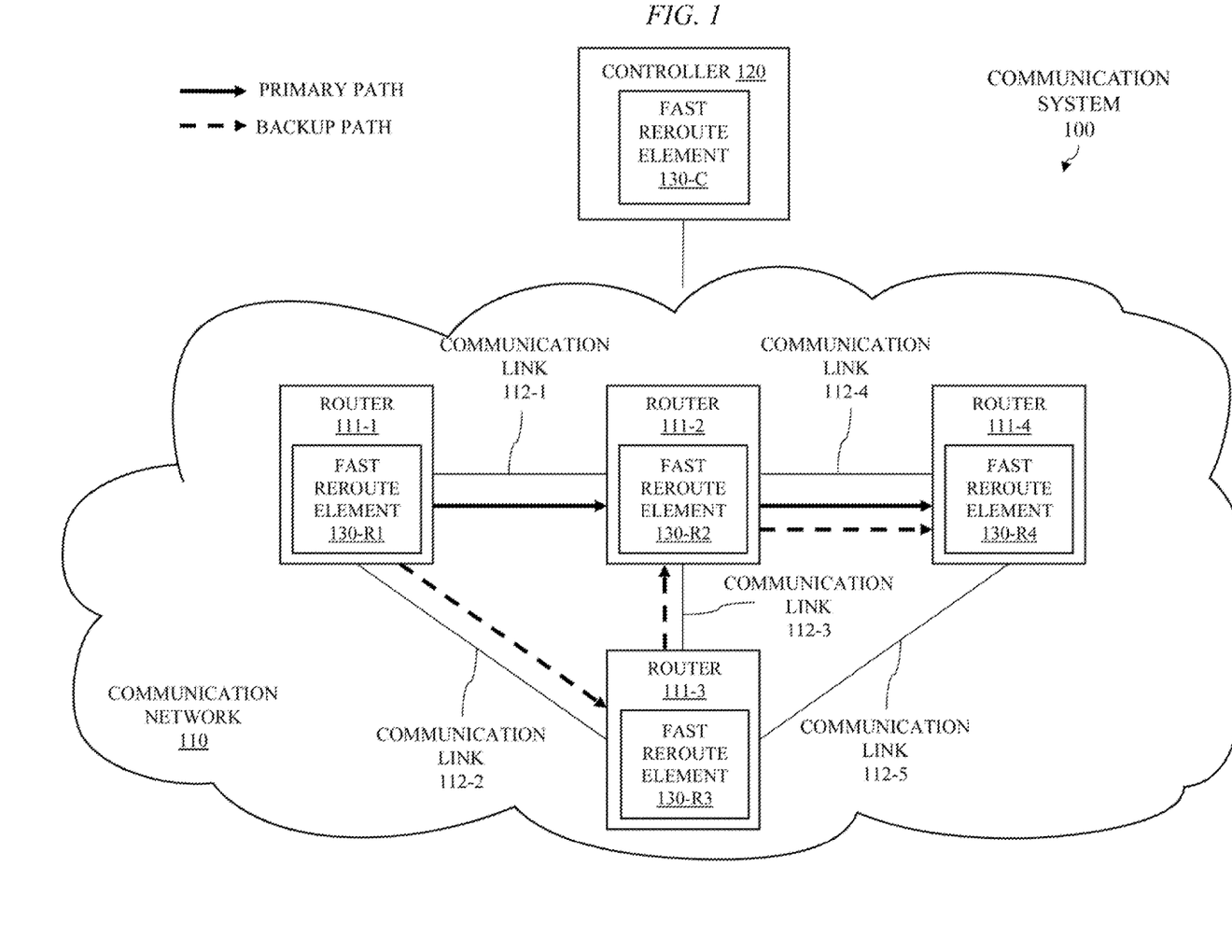
FIG. 1 depicts an example embodiment of a communication network configured to support selection of protection paths for tunnel-over-tunnel topologies.

FIG. 1 depicts an example embodiment of a communication system configured to support selection of protection paths for tunnel-over-tunnel topologies.

The communication system 100 includes a communication network 110 and a controller 120. The communication network 110 may be configured to support communication using various communication methodologies. The controller 120 may be configured to provide various network control functions for the communication network 110. It will be appreciated that the communication system 100, although primarily presented as having a specific implementation, may be implemented in various other ways.

The communication network 110 includes a set of routers 111-1 to 111-4 (collectively, routers 111) and a set of communication links 112-1 to 112-5 (collectively, communication links 112). The routers 111-1 and 111-2 are connected by communication link 112-1, the routers 111-1 and 111-3 are connected by communication link 112-2, the routers 111-2 and 111-3 are connected by communication link 112-3, the routers 111-2 and 111-4 are connected by communication link 112-4, and the routers 111-3 and 111-4 are connected by communication link 112-5. It will be appreciated that the communication network 110, although primarily presented with respect to a specific topology (i.e., specific numbers and arrangements of routers 111 and communication links 112), may be implemented in various other topologies (e.g., using other numbers and/or arrangements of routers 111 and/or communication links 112).

The communication network 110 may be configured to support communication using various communication methodologies. For example, Multiprotocol Label Switching (MPLS) is a method used to route data packets to a destination in an interconnected network. MPLS may be supported using various communication protocols. For example, MPLS may be supported using protocols such as Border Gateway Protocol (BGP), BGP-Labeled Unicast (BGP-LU), Label Distribution Protocol (LDP), Resource Reservation Protocol (RSVP), RSV-Traffic Engineering (RSVP-TE), Segment Routing (SR), SR-Traffic Engineering (SR-TE), Segment Routing-Intermediate System to Intermediate System (SR-ISIS), Segment Routing-Open Shortest Path First (SR-OSPF), or the like, as well as various combinations thereof. It will be appreciated that, although primarily described with respect to use of specific protocols for supporting use of MPLS, various other protocols may be used to support use of MPLS in the communication network 110. It will be appreciated that, although primarily described with respect to use of MPLS for routing data packets, various other communication methodologies and associated communication protocols may be used to support routing of data packets in the communication network 110.

MPLS uses labels in the header of the packet to determine the next hop in the path for the packet. In order to provide resiliency, a network protocol using MPLS can select both a primary path and a backup path for the network protocol, and both the primary path and the backup path can be programmed to the datapath so that, in the case of a failure of the primary path, the network traffic can be switched from the primary path to the backup path with minimal loss of data. The primary and backup paths each have unique outgoing labels and outgoing interfaces, respectively. Some network topologies can use multiple levels of MPLS protocols to route the packets through the network, which is referred to as "tunnel-over-tunnel". Routing a packet using tunnel-over-tunnel requires adding a stack of labels, rather than a single label, to the outgoing packet, where the labels in the stack of labels correspond to the tunnel layers of the tunnel. It will be appreciated that "tunnel-over-tunnel" can support nesting of any suitable number of protocol layers.

Tunnel-over-tunnel uses multiple levels of MPLS protocols, arranged hierarchically, to route packets. It will be appreciated that various hierarchies of protocols may be supported for tunnel-over-tunnel topologies. For example, one hierarchy of protocols may include SVC over BGP over SR-TE (denoted as SVC o BGP o SR-TE(oSR-IGP)). For example, one hierarchy of protocols may include SVC over BGP over one of LDP, RSVP, SR-ISIS, or SR-OSPF (denoted as SVC o BGP o LDP/RSVP/SR-ISIS/SR-OSPF). For example, one hierarchy of protocols may include SVC over SR-TE (denoted as SVC o SR-TE (o SR-IGP)). For example, one hierarchy of protocols may include SVC over LDP over RSVP-TE (denoted as SVC o LDP o RSVP-TE). It will be appreciated that various other hierarchies of protocols (e.g. using fewer or more protocols in fewer or more hierarchical layers, using different combinations of MPLS protocols, or the like, as well as various combinations thereof) may be used to provide tunnel-over-tunnel topologies.

Tunnel-over-tunnel uses multiple levels of MPLS protocols, arranged hierarchically, to route packets. In a tunnel-over-tunnel topology, each of the MPLS protocols in the hierarchy of MPLS protocols can have primary and backup paths. For example, if there is an MPLS path from an inner (higher layer) protocol with a primary path and a backup path, and both of those paths route over a transport tunnel based on an outer (lower layer) protocol and each has a primary path and a backup path, then there is a total of four different paths to route the packet even though there are only two levels of the hierarchy of MPLS protocols. The situation may then become more complex where a tunnel-over-tunnel topology uses more than two levels of protocols. For example, if the tunnel-over-tunnel topology uses three levels of MPLS protocols (e.g., BGP-LU routed SR-TE routed over SR-ISIS), there can be up to eight different paths for the tunnel-over-tunnel topology where each of the protocols supports primary and backup paths. It will be appreciated that the presence of additional layers in the tunnel-overtunnel topology may result in additional paths and, thus, further complicate the situation.

Tunnel-over-tunnel may rely on programming of paths to the network processor of the node at which the paths are supported. While some network processors may support programming of each of the paths of a tunnel-over-tunnel topology, some network processors may be limited in terms of the number of paths which may be programmed therein. For example, some network processors may be limited to programming of only a single primary path and a single backup path of a tunnel-over-tunnel topology. For example, although some network processors may support two stages of path protection, in many such network processors the first stage may be reserved for Internet Protocol (IP) level protection where an IP route has a primary path and a backup path and, thus, this would still only leave a single stage for programming of the primary path and the backup path for the MPLS level protection. Examples of a primary path and a backup path for a tunnel-over-tunnel topology are illustrated within the context of the communication network 110.

Various example embodiments may be configured to select which paths to use as the primary path and the backup path in a tunnel-over-tunnel topology when programming paths to the network processor. Various example embodiments may be configured to support a dynamic process for selecting which paths to use as the primary and backup paths in a tunnel-over-tunnel topology when programming paths to the network processor. Various example embodiments may be configured to determine application of protection to a primary path in a tunnel-over-tunnel topology based on selection of the appropriate protocol layer—and, thus, the appropriate protocol—on which to apply protection for the primary path (i.e., which backup path is programmed to the network processor for the primary path). Various example embodiments may be configured to determine application of protection to a primary path in a tunnel-over-tunnel topology, based on selection of the appropriate protocol layer on which to apply protection for the primary path, in a manner tending to prefer the lowest level protocol in the hierarchy of protocols in the tunnel-over-tunnel topology, thereby obviating the need for use of a static policy in which the innermost (highest) level protocol in the hierarchy of protocols in the tunnel-over-tunnel topology is selected as the layer on which to apply protection for the primary path.

Various example embodiments may be configured to determine application of protection to a primary path in a tunnel-over-tunnel topology, in a manner tending to prefer the lowest level protocol in the hierarchy of protocols in the tunnel-over-tunnel topology, by evaluating the protocols in the hierarchy of protocols. The protocols in the hierarchy of protocols may be evaluated based on a set of parameters. The protocols in the hierarchy of protocols may be evaluated on a protocol by protocol basis, which corresponds to a level by level basis within the hierarchy of protocols, by evaluating the set of parameters for each protocol in the hierarchy of protocols in a manner that attempts to push protection for the tunnel-over-tunnel topology toward a lowest level protocol in the hierarchy of protocols. The set of parameters may include, for a given protocol (or associated protocol level) in the hierarchy of protocols, a parameter indicative of an availability of a lower level protocol over which the given protocol is routed, a parameter indicative as to whether to defer protection from the given protocol to the lower level protocol, and a parameter indicative as to an availability of a backup path at the lower level protocol. It will be appreciated that these parameters may be evaluated in various ways for determining application of protection to the primary path in the tunnel-over-tunnel topology.

The parameter indicative as to whether to defer protection from the given protocol to the lower level protocol may be dynamically controlled by the customer. For example, the parameter indicative as to whether to defer protection from the given protocol to the lower level protocol may be dynamically controlled by the network operator, such as by one or more users of the network operator, one or more controllers of the network operator, or the like, as well as various combinations thereof. For example, the parameter indicative as to whether to defer protection from the given protocol to the lower level protocol may be dynamically controlled via a command line interface (CLI) and, accordingly, also may be referred to herein as a "CLI Knob" as it may be dynamically adjusted via the CLI in order to dynamically control deferral of protection from inner layers of the tunnel-over-tunnel topology to outer layers of the tunnel-over-tunnel topology.

The application of the parameters to determine HW FRR programming for a primary path may be further understood by considering the examples presented with respect to Tables 1-4.

Tables 1-4 each capture the protection applied for different transport options. In each of Tables 1-4, the leftmost column (labeled "FRR Programmed") captures the availability of protection for FRR (i.e., the listed protocols are the protocols for which FRR next-hops are available). In each of Tables 1-4, the remaining column(s) other than the leftmost column represent(s) the Flag(s) associated with application of the "prefer-transport-frr" configuration. In other words, the FRR Protection column indicates availability of FRR protection paths at particular protocols and the Flags columns indicate how the protection for the primary path might shift based on FRR preference indicators (which also may be referred to as the CLI knobs since preferences may be set via a CLI). So, the values in the cells at the intersection of the FRR Programmed parameter and the Flag(s) parameter(s) indicate whether or to protection is applied and, in the case where protection is applied, the level of the hierarchy at which protection is applied to provide the associated protection path for a primary path (e.g., "No FRR" means that no FRR protection path is configured for the primary path, whereas recitation of a protocol indicates the protocol on which the FRR protection path is provided for the primary path). The application of these parameters to control selection of the layer of the protocol hierarchy at which the FRR protection path is to be established may be further understood by way of reference to the example embodiments of Tables 1-4.

Table 1 depicts an example embodiment of an application of the parameters to determine HW FRR programming for a primary path that is based on SVC over BGP over SR-TE (denoted as SVC o BGP o SR-TE(oSR-IGP)).

TABLE 1

| FRR Programmed | No Flags | BGP Flag | SR-TE Flag | BGP & SR-TE Flags |
|---|---|---|---|---|
| None | No FRR | No FRR | No FRR | No FRR |
| BGP | BGP | BGP | BGP | BGP |
| SR-TE | No FRR | SR-TE | No FRR | SR-TE |
| SR | No FRR | No FRR | No FRR | SR |
| BGP & SR-TE | BGP | SR-TE | BGP | SR-TE |
| BGP & SR | BGP | BGP | BGP | SR |

TABLE 1-continued

| FRR Programmed | No Flags | BGP Flag | SR-TE Flag | BGP & SR-TE Flags |
|---|---|---|---|---|
| SR-TE & SR | No FRR | SR-TE | No FRR | SR |
| BGP & SR-TE & SR | BGP | SR-TE | BGP | SR |

In Table 1, the No Flags column indicates that neither the BGP Flag nor the SR-TE Flag are set (i.e., deferral is not set at the BGP or SR-TE levels), the BGP Flag column indicates that the BGP Flag is set and the SR-TE Flag is not set (i.e., deferral is set at the BGP level but is not set at the SR-TE level), the SR-TE Flag column indicates that the BGP Flag is not set but the SR-TE Flag is set (i.e., deferral is set at the SR-TE level but is not set at the BGP level), and the BGP & SR-TE Flags column indicates that both the BGP Flag and the SR-TE Flag are set (i.e., deferral is set at the BGP level and at the SR-TE level).

In the first row of Table 1, irrespective of which FRR preference flags are set, no FRR protection is provided for the primary path (all four entries are marked as "No FRR") since, as indicated by the leftmost column, no backup paths are available for BGP, SR-TE, or SR. Since no backup paths are available, FRR protection cannot be provided for the primary path.

In the second row of Table 1, the FRR Programmed column indicates availability of BGP protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is BGP, since a BGP backup path is available. For example, in the case that the FRR protection preference is set at the BGP level (i.e., the BGP Flag is set) to request deferral of protection to the SR-TE level, given the lack of availability of a backup path at the SR-TE level (as indicated by the FRR Programmed column), HW FRR protection of the protection path falls back to the higher level, which is BGP, since a BGP backup path is available. For example, in the case that the FRR protection preference is set at the SR-TE level (i.e., the SR-TE Flag is set) to request deferral of protection to the SR level, given the lack of availability of a backup path at the SR level or the SR-TE level (as indicated by the FRR Programmed column), HW FRR protection of the protection path falls back to the higher level, which is BGP, since a BGP backup path is available. For example, in the case that the FRR protection preference is set at both the BGP and SR-TE levels (i.e., the BGP Flag and the SR-TE Flag are both set) to request deferral of protection to the SR level, given the lack of availability of a backup path at the SR level or the SR-TE level (as indicated by the FRR Programmed column), HW FRR protection of the protection path falls back to the higher level, which is BGP, since a BGP backup path is available.

In the third row of Table 1, the FRR Programmed column indicates availability of SR-TE protection, and the FRR preference flag columns indicate how the protection for the primary path might shift based on the FRR preference flags. For example, in the case that no FRR preference is configured (i.e., the No Flag column), no FRR protection is provided for the primary path (the entry is marked as "No FRR") since, as indicated by the leftmost column, no backup path is available at the BGP level. For example, in the case that the FRR protection preference is set at the BGP level (i.e., the BGP Flag is set) to request deferral of protection to the SR-TE level, given the availability of a backup path at the SR-TE level (as indicated by the FRR Programmed column), HW FRR protection of the protection path is shifted to the SR-TE level. For example, in the case that the FRR protection preference is set at the SR-TE level (i.e., the SR-TE Flag is set) to request deferral of protection to the SR level, given the lack of availability of backup paths at the SR level or the BGP level (as indicated by the FRR Programmed column) and that the FRR protection preference is not set at the BGP level even though a backup path is available at the SR-TE level, no FRR protection is provided for the primary path (the entry is marked as "No FRR"). For example, in the case that the FRR protection preference is set at both the BGP and SR-TE levels (i.e., the BGP Flag and the SR-TE Flag are both set) to request deferral of protection to the SR level, given the lack of availability of a backup path at the SR level (as indicated by the FRR Programmed column) but the availability of a backup path at the SR-TE level, HW FRR protection of the protection path is shifted to the SR-TE level.

In the fourth row of Table 1, the FRR Programmed column indicates availability of SR protection, and the FRR preference flag columns indicate how the protection for the primary path might shift based on the FRR preference flags. For example, in the case that no FRR preference is configured (i.e., the No Flag column), no FRR protection is provided for the primary path (the entry is marked as "No FRR") since, as indicated by the leftmost column, no backup path is available at the SR-TE level or the BGP level. For example, in the case that the FRR protection preference is set at the BGP level (i.e., the BGP Flag is set) to request deferral of protection to the SR-TE level, no FRR protection is provided for the primary path (the entry is marked as "No FRR") since, as indicated by the leftmost column, no backup path is available at the SR-TE level or the BGP level. For example, in the case that the FRR protection preference is set at the SR-TE level (i.e., the SR-TE Flag is set) to request deferral of protection to the SR level, no FRR protection is provided for the primary path (the entry is marked as "No FRR") since, as indicated by the leftmost column, no backup path is available at the SR level, the SR-TE level, or the BGP level. For example, in the case that the FRR protection preference is set at both the BGP and SR-TE levels (i.e., the BGP Flag and the SR-TE Flag are both set) to request deferral of protection to the SR level, given the availability of a backup path at the SR level (as indicated by the FRR Programmed column), HW FRR protection of the protection path is shifted to the SR level.

In the fifth row of Table 1, the FRR Programmed column indicates availability of both BGP and SR-TE protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is BGP, since a BGP backup path is available. For example, in the case that the FRR protection preference is set at the BGP level (i.e., the BGP Flag is set) to request deferral of protection to the SR-TE level, given the availability of a backup path at the SR-TE level (as indicated by the FRR Programmed column), HW FRR protection of the protection path is shifted to the SR-TE level. For example, in the case that the FRR protection preference is set at the SR-TE level (i.e., the SR-TE Flag is set) to request deferral of protection to the SR level, given the lack of availability of a backup path at the SR level (as indicated by the FRR Programmed column) and that the FRR protection preference is not set at the BGP level even though a backup path is available at the SR-TE level, HW FRR protection of the protection path falls back to the higher level, which is BGP. For example, in the case that the FRR protection preference is set at both the BGP and SR-TE levels (i.e., the BGP Flag and the SR-TE Flag are both set) to request deferral of protection to the SR level, given the lack of availability of a backup path at the SR level (as indicated by the FRR Programmed column) but the availability of a backup path at the SR-TE level and that the FRR protection preference is set at the BGP level to defer protection to the SR-TE level, HW FRR protection of the protection path may still be provided at the SR-TE level and, thus, falls back from the preferred SR level to the next inner level, which is SR-TE.

In the sixth row of Table 1, the FRR Programmed column indicates availability of both BGP and SR protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is BGP, since a BGP backup path is available. For example, in the case that the FRR protection preference is set at the BGP level (i.e., the BGP Flag is set) to request deferral of protection to the SR-TE level, given the lack of availability of a backup path at the SR-TE level (as indicated by the FRR Programmed column), HW FRR protection of the protection path falls back to the higher level, which is BGP, since a BGP backup path is available. For example, in the case that the FRR protection preference is set at the SR-TE level (i.e., the SR-TE Flag is set) to request deferral of protection to the SR level, given the availability of a backup path at the SR level (as indicated by the FRR Programmed column) but the lack of availability of a backup path at the SR-TE level and that the FRR protection preference is not set at the BGP level, HW FRR protection of the protection path falls back to the higher level, which is BGP. For example, in the case that the FRR protection preference is set at both the BGP and SR-TE levels (i.e., the BGP Flag and the SR-TE Flag are both set) to request deferral of protection to the SR level, given the availability of a backup path at the SR level (as indicated by the FRR Programmed column), HW FRR protection of the protection path is provided at the SR level.

In the seventh row of Table 1, the FRR Programmed column indicates availability of both SR-TE and SR protection, and the FRR preference flag columns indicate how the protection for the primary path might shift based on the FRR preference flags. For example, in the case that no FRR preference is configured (i.e., the No Flag column), no FRR protection is provided for the primary path (the entry is marked as "No FRR") since, as indicated by the leftmost column, no backup path is available at the BGP level. For example, in the case that the FRR protection preference is set at the BGP level (i.e., the BGP Flag is set) to request deferral of protection to the SR-TE level, given the availability of a backup path at the SR-TE level (as indicated by the FRR Programmed column), HW FRR protection of the protection path is provided at the SR-TE level. For example, in the case that the FRR protection preference is set at the SR-TE level (i.e., the SR-TE Flag is set) to request deferral of protection to the SR level, given the that the FRR protection preference is not set at the BGP level even though a backup path is available at the SR level, and the lack of availability of a backup path at the BGP level (as indicated by the FRR Programmed column), no FRR protection is provided for the primary path (the entry is marked as "No FRR"). For example, in the case that the FRR protection preference is set at both the BGP and SR-TE levels (i.e., the BGP Flag and the SR-TE Flag are both set) to request deferral of protection to the SR level, given the availability of a backup path at the SR level (as indicated by the FRR Programmed column), HW FRR protection of the protection path is provided at the SR level.

In the eighth row of Table 1, the FRR Programmed column indicates availability of BGP, SR-TE, and SR protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is BGP, since a BGP backup path is available. For example, in the case that the FRR protection preference is set at the BGP level (i.e., the BGP Flag is set) to request deferral of protection to the SR-TE level, given the availability of a backup path at the SR-TE level (as indicated by the FRR Programmed column), HW FRR protection of the protection path is provided at SR-TE level. For example, in the case that the FRR protection preference is set at the SR-TE level (i.e., the SR-TE Flag is set) to request deferral of protection to the SR level, although backup paths are available at both the SR and SR-TE levels, HW FRR protection of the protection path is provided at the inner level, which is BGP, since the FRR protection preference is not set at the BGP level. For example, in the case that the FRR protection preference is set at both the BGP and SR-TE levels (i.e., the BGP Flag and the SR-TE Flag are both set) to request deferral of protection to the SR level, given the availability of a backup path at the SR level (as indicated by the FRR Programmed column), HW FRR protection of the protection path is provided at the SR level.

Table 2 depicts an example embodiment of an application of the parameters to determine HW FRR programming for a primary path that is based on SVC over BGP over one of LDP, RSVP, SR-ISIS, or SR-OSPF (denoted as SVC o BGP o LDP/RSVP/SR-ISIS/SR-OSPF).

TABLE 2

| FRR Programmed | No Flags | BGP Flag |
| --- | --- | --- |
| None | No FRR | No FRR |
| BGP | BGP | BGP |
| LDP/RSVP/SR | No FRR | LDP/RSVP/SR |
| BGP & LDP/RSVP/SR | BGP | LDP/RSVP/SR |

In Table 2, the No Flags column indicates that the BGP Flag is not set (i.e., deferral is not set at the BGP level) and the BGP Flag column indicates that the BGP Flag is set.

In the first row of Table 2, irrespective of which FRR preference flags are set, no FRR protection is provided for the primary path (both entries are marked as "No FRR") since, as indicated by the leftmost column, no backup paths are available. Since no backup paths are available, FRR protection cannot be provided for the primary path.

In the second row of Table 2, the FRR Programmed column indicates availability of BGP protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is BGP, since a BGP backup path is available. For example, in the case that the FRR protection preference is set at the BGP level (i.e., the BGP Flag is set) to request deferral of protection to the lower level (e.g., LDP/RSVP/SR), given the lack of availability of a backup path at the lower level (as indicated by the FRR Programmed column), HW FRR protection of the protection path falls back to the higher level, which is BGP, since a BGP backup path is available.

In the third row of Table 2, the FRR Programmed column indicates availability of LDP/RSVP/SR protection, and the FRR preference flag columns indicate how the protection for the primary path might shift based on the FRR preference flags. For example, in the case that no FRR preference is configured (i.e., the No Flag column), no FRR protection is provided for the primary path (the entry is marked as "No FRR") since, as indicated by the leftmost column, no backup path is available at the BGP level. For example, in the case that the FRR protection preference is set at the BGP level (i.e., the BGP Flag is set) to request deferral of protection to the lower level (e.g., LDP/RSVP/SR), given the availability of a backup path at the lower level (as indicated by the FRR Programmed column), HW FRR protection of the protection path is provided at the lower level (e.g., LDP/RSVP/SR).

In the fourth row of Table 2, the FRR Programmed column indicates availability of BGP and LDP/RSVP/SR protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is BGP, since a BGP backup path is available and deferral of protection to the lower level (e.g., LDP/RSVP/SR) is not requested. For example, in the case that the FRR protection preference is set at the BGP level (i.e., the BGP Flag is set) to request deferral of protection to the lower level (e.g., LDP/RSVP/SR), given the availability of a backup path at the lower level (as indicated by the FRR Programmed column), HW FRR protection of the protection path is provided at the lower level (e.g., LDP/RSVP/SR).

Table 3 depicts an example embodiment of an application of the parameters to determine HW FRR programming for a primary path that is based on SVC over SR-TE (denoted as SVC o SR-TE (o SR-IGP)).

TABLE 3

| FRR Programmed | No Flags | SR-TE Flag |
|---|---|---|
| None | No FRR | No FRR |
| SR-TE | SR-TE | SR-TE |
| SR | No FRR | SR |
| SR-TE & SR | SR-TE | SR |

In Table 3, the No Flags column indicates that the SR-TE Flag is not set (i.e., deferral is not set at the SR-TE level) and the SR-TE Flag column indicates that the SR-TE Flag is set.

In the first row of Table 3, irrespective of which FRR preference flags are set, no FRR protection is provided for the primary path (both entries are marked as "No FRR") since, as indicated by the leftmost column, no backup paths are available. Since no backup paths are available, FRR protection cannot be provided for the primary path.

In the second row of Table 3, the FRR Programmed column indicates availability of SR-TE protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is SR-TE, since an SR-TE backup path is available. For example, in the case that the FRR protection preference is set at the SR-TE level (i.e., the SR-TE Flag is set) to request deferral of protection to the lower level, which is SR, given the lack of availability of a backup path at the lower level (as indicated by the FRR Programmed column), HW FRR protection of the protection path falls back to the higher level, which is SR-TE, since an SR-TE backup path is available.

In the third row of Table 3, the FRR Programmed column indicates availability of SR protection, and the FRR preference flag columns indicate how the protection for the primary path might shift based on the FRR preference flags. For example, in the case that no FRR preference is configured (i.e., the No Flag column), no FRR protection is provided for the primary path (the entry is marked as "No FRR") since, as indicated by the leftmost column, no backup path is available at the SR-TE level. For example, in the case that the FRR protection preference is set at the SR-TE level (i.e., the SR-TE Flag is set) to request deferral of protection to the lower level (SR), given the availability of a backup path at the lower level (as indicated by the FRR Programmed column), HW FRR protection of the protection path is provided at the lower level (SR).

In the fourth row of Table 3, the FRR Programmed column indicates availability of SR-TE and SR protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is SR-TE, since an SR-TE backup path is available and deferral of protection to the lower level (SR) is not requested. For example, in the case that the FRR protection preference is set at the SR-TE level (i.e., the SR-TE Flag is set) to request deferral of protection to the lower level (SR), given the availability of a backup path at the lower level (as indicated by the FRR Programmed column), HW FRR protection of the protection path is provided at the lower level (SR).

Table 4 depicts an example embodiment of an application of the parameters to determine HW FRR programming for a primary path that is based on SVC over LDP over RSVP-TE (denoted as SVC o LDP o RSVP-TE).

TABLE 1

| FRR Programmed | No Flags | SR-TE Flag |
|---|---|---|
| None | No FRR | No FRR |
| LDP | LDP | LDP |
| RSVP-TE | No FRR | RSVP-TE |
| LDP & RSVP-TE | LDP | RSVP-TE |

In Table 4, the No Flags column indicates that the SR-TE Flag is not set (i.e., deferral is not set at the SR-TE level) and the SR-TE Flag column indicates that the SR-TE Flag is set.

In the first row of Table 4, irrespective of which FRR preference flags are set, no FRR protection is provided for the primary path (both entries are marked as "No FRR") since, as indicated by the leftmost column, no backup paths are available. Since no backup paths are available, FRR protection cannot be provided for the primary path.

In the second row of Table 4, the FRR Programmed column indicates availability of LDP protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is LDP, since an LDP backup path is available. For example, in the case that the FRR protection preference is set at the SR-TE level (i.e., the SR-TE Flag is set) to request deferral of protection to the lower level, which is RSVP-TE, given the lack of availability of a backup path at the lower level (as indicated by the FRR Programmed column), HW FRR protection of the protection path falls back to the higher level, which is LDP, since an LDP backup path is available.

In the third row of Table 4, the FRR Programmed column indicates availability of RSVP-TE protection, and the FRR preference flag columns indicate how the protection for the primary path might shift based on the FRR preference flags. For example, in the case that no FRR preference is configured (i.e., the No Flag column), no FRR protection is provided for the primary path (the entry is marked as "No FRR") since, as indicated by the leftmost column, no backup path is available at the LDP level. For example, in the case that the FRR protection preference is set at the SR-TE level (i.e., the SR-TE Flag is set) to request deferral of protection to the lower level (RSVP-TE), given the availability of a backup path at the lower level (as indicated by the FRR Programmed column), HW FRR protection of the protection path is provided at the lower level (RSVP-TE).

In the fourth row of Table 4, the FRR Programmed column indicates availability of LDP and RSVP-TE protection, and the FRR preference flag columns indicate how the protection for the primary path might shift based on the FRR preference flags. For example, in the case that no FRR preference is configured (i.e., the No Flag column), HW FRR protection of the protection path is provided at the inner level, which is LDP, since an LDP backup path is available and deferral of protection to the lower level (RSVP-TE) is not requested. For example, in the case that the FRR protection preference is set at the SR-TE level (i.e., the SR-TE Flag is set) to request deferral of protection to the lower level (RSVP-TE), given the availability of a backup path at the lower level (as indicated by the FRR Programmed column), HW FRR protection of the protection path is provided at the lower level (RSVP-TE).

The communication system 100, as indicated above, is configured to support protection of paths in the communication network 110 based on support for determination of application of protection to primary paths in tunnel-over-tunnel topologies. For example, as illustrated in FIG. 1, the support for protection of paths in the communication network 110 may be provided using various FRR elements 130, which may include FRR elements 130-R1 to 130-R4 implemented on the routers 111-1 to 111-4, respectively), FRR element 130-C implemented on controller 120, or the like, as well as various combinations thereof. The FRR elements 130 may be configured to provide various functions for supporting determination of application of protection to primary paths in tunnel-over-tunnel topologies (e.g., evaluation of parameters to dynamically control selection of backup paths to be used for primary paths in a manner tending to prefer application of protection at the outermost (lowest) layers in the hierarchies of protocols supported for the primary paths).

It will be appreciated that the communication system 100, although primarily presented as having a specific implementation, may be implemented in various other ways.

Figure 2:
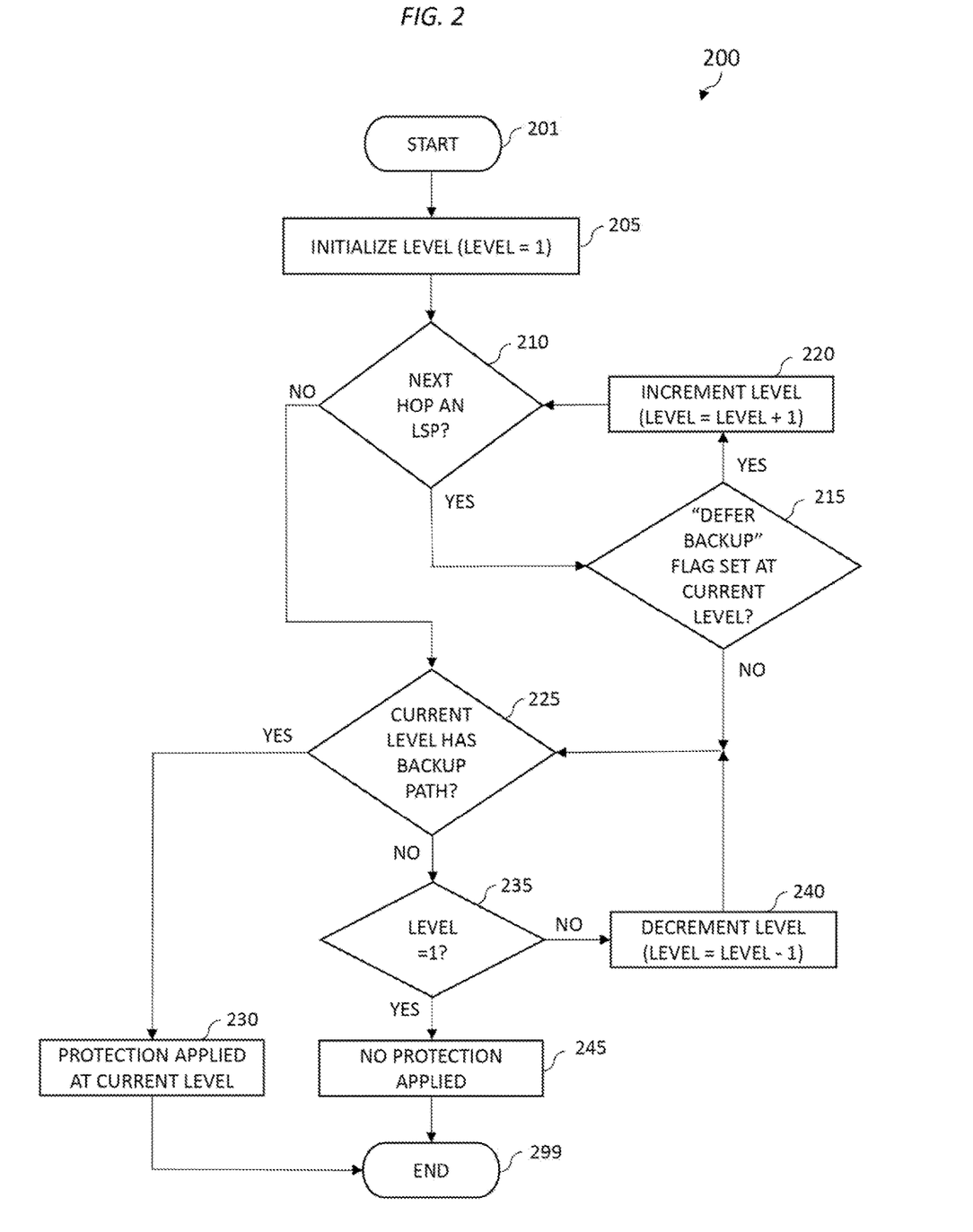
FIG. 2 depicts an example embodiment of a method configured to support selection of protection paths for tunnel-over-tunnel topologies.

FIG. 2 depicts an example embodiment of a method configured to support selection of protection paths for tunnel-over-tunnel topologies. It will be appreciated that, although primarily presented herein as being performed serially, at least a portion of the functions of method 200 may be performed contemporaneously or in a different order than as presented in FIG. 2.

At block 201, the method 200 begins.

At block 205, a protocol level parameter is initialized to one (LEVEL=1) for a primary path that is based on a hierarchy of protocols (e.g., a tunnel-over-tunnel path). In the hierarchy of protocols of the primary path, an outer layer (lower layer) encapsulates an inner layer (higher layer). The protocol level parameter is initialized to correspond to the innermost protocol in the hierarchy of protocols of the primary path. For example, where the hierarchy of protocols is SVC over BGP over SR-TE (denoted as SVC o BGP o SR-TE(oSR-IGP)), the initialization of the protocol level parameter causes the protocol level parameter to point to BGP.

At block 210, a determination is made as to whether a next hop for the primary path, relative to the current protocol level indicated by the protocol level parameter for the primary path, is an LSP. This may be considered to be a determination as to whether there is a next outer layer of a tunnel for the primary path. If the next hop for the primary path is an LSP (i.e., the current protocol level is not the outermost layer of the tunnel for the primary path), then the method 200 proceeds to block 215. If the next hop for the primary path is not an LSP (i.e., the current protocol level is the outermost layer of the tunnel for the primary path), then the method 200 proceeds to block 225. For example, where the hierarchy of protocols is SVC over BGP over SR-TE (denoted as SVC o BGP o SR-TE(oSR-IGP)), when the protocol level parameter is pointing to BGP then a determination will be made that there is a next outer layer of the tunnel (in this example, SR-TE), whereas when the protocol level parameter is pointing to SR then a determination will be made that there is not a next outer layer of the tunnel (i.e., SR is the outermost MPLS tunnel protocol).

At block 215, a determination is made as to whether a Defer Backup flag is set at the current protocol level indicated by the protocol level parameter for the primary path. The Defer Backup flag provides an indication as to whether or not there is a preference to defer protection from the current protocol level indicated by the protocol level parameter for the primary path to a next lower layer in the hierarchy of protocols for the primary path. For example, where the hierarchy of protocols is SVC over BGP over SR-TE (denoted as SVC o BGP o SR-TE(oSR-IGP)), when the protocol level parameter is pointing to BGP then the Defer Backup flag at the BGP level is checked to determine whether there is a preference to defer protection for the primary path from the BGP level to the next lower layer in the hierarchy of protocols for the primary path (SR-TE in this example).

If the Defer Backup flag is set at the current protocol level, then the method 200 proceeds to block 220. In this case, since there is an indication of a preference to defer protection from the current protocol level indicated by the protocol level parameter for the primary path to a next lower layer in the hierarchy of protocols for the primary path, then attempts are made to push the protection to a next lower layer in the hierarchy of protocols, depending on availability of a next lower layer in the hierarchy of protocols of the primary path (i.e., whether there is a next outer tunnel layer of the tunnel-over-tunnel primary path) and availability of a backup path at the next lower layer in the hierarchy of protocols of the primary path. For example, where the hierarchy of protocols is SVC over BGP over SR-TE (denoted as SVC o BGP o SR-TE(oSR-IGP)), when the protocol level parameter is pointing to BGP and the Defer Backup flag is set, this indicates a preference to defer protection for the primary path from BGP to SR-TE.

At block 220, the protocol level parameter is incremented by one (LEVEL=LEVEL+1). This shifts the protocol level parameter to a next outer protocol layer of the tunnel for the primary path, in an attempt to apply protection at the preferred protection level (the preferred protocol layer, which may or may not be the lowest (or outermost) protocol layer) for the primary path. From block 220, the method 200 returns to block 210, where a determination is made as to whether a next hop for the primary path, relative to the current protocol level indicated by the protocol level parameter for the primary path, is an LSP. For example, where the hierarchy of protocols is SVC over BGP over SR-TE (denoted as SVC o BGP o SR-TE(oSR-IGP)), when the protocol level parameter is incremented, this changes the current protocol level from BGP to SR-TE.

It will be appreciated that the loop of blocks 210-215-220 attempts to find the preferred protection level (the preferred protocol layer, which may or may not be the lowest (or outermost) protocol layer) for the primary path in an attempt to defer protection to this preferred protection level.

If the Defer Backup flag is not set at the current protocol level, then the method 200 proceeds to block 225. In this case, since there is no indication of a preference to defer protection from the current protocol level indicated by the protocol level parameter for the primary path to a next lower layer in the hierarchy of protocols for the primary path, then any protection that is applied will need to be applied at the current protocol level or a higher layer of the hierarchy of protocols for the primary path, depending on the availability of backup paths at those layers of the hierarchy of protocols for the primary path. For example, where the hierarchy of protocols is SVC over BGP over SR-TE (denoted as SVC o BGP o SR-TE(oSR-IGP)), when the protocol level parameter is pointing to SR-TE and the Defer Backup flag is not set, this indicates that protection for the primary path is not to be deferred to SR and, instead, is to be provided at the SR-TE level or the BGP level (if possible).

At block 225, a determination is made as to whether a backup path is available at the current protocol level. For example, where the hierarchy of protocols is SVC over BGP over SR-TE (denoted as SVC o BGP o SR-TE(oSR-IGP)), when the protocol level parameter is pointing to SR-TE, a determination is made as to whether an SR-TE backup path is available for the primary path. If a backup path is available at the current protocol level, then the method 200 proceeds to block 230. If a backup path is not available at the current protocol level, then the method 200 proceeds to block 235.

At block 230, a determination is made to use the backup path at the current protocol level. The indication that the backup path at the current protocol level is being used to protect the primary path may be configured into the data path of the router. For example, where the hierarchy of protocols is SVC over BGP over SR-TE (denoted as SVC o BGP o SR-TE(oSR-IGP)), when the protocol level parameter is pointing to SR-TE at this point, the available SR-TE backup path may be used to protect the primary path. From block 230, the method 200 proceeds to block 299, where the method 200 ends.

At block 235, a determination is made as to whether the current protocol level is the lowest level (i.e., the protocol level parameter (LEVEL) is set equal to the value to which it was initialized (LEVEL=1)). For example, where the hierarchy of protocols is SVC over BGP over SR-TE (denoted as SVC o BGP o SR-TE(oSR-IGP)), this is a determination as to whether the current protocol level is BGP. If the current protocol level is not the lowest level, then the method 200 proceeds to block 240. If the current protocol level is the lowest level, then the method 200 proceeds to block 245.

At block 240, the protocol level parameter (LEVEL) is decremented by one (LEVEL=LEVEL−1). This moves protocol level parameter to a next inner protocol layer of the tunnel for the primary path. For example, where the hierarchy of protocols is SVC over BGP over SR-TE (denoted as SVC o BGP o SR-TE(oSR-IGP)), when the protocol level parameter is pointing to SR-TE, the protocol level parameter is changed so that the current protocol level changes from SR-TE to the next highest layer, which is BGP. From block 240, the method 200 returns to block 225, where a determination is made as to whether a backup path is available at the current protocol level in an attempt to apply protection at the lowest (or outermost) protocol layer possible for the primary path (as long as there is a backup path available at that level, as will be determined at block 225).

It will be appreciated that the loop of blocks 225 (NO)-235-240 attempts to find the outermost protocol layer of the primary path for which there is a preference to defer protection and for which there is a backup path available, so as to enable application of protection at the layer of the hierarchy of protocols that is closest to the preferred protection level for the primary path.

At block 245, a determination is made that no protection is to be applied for the primary path. Here, even though there may have been indications of preferences to apply protection at one or more of the outer (lower) layers of the primary path, lack of availability of backup paths at any of those protocol layers may result in a situation in which protection simply cannot be applied.

At block 299, the method 200 ends.

Figure 3:
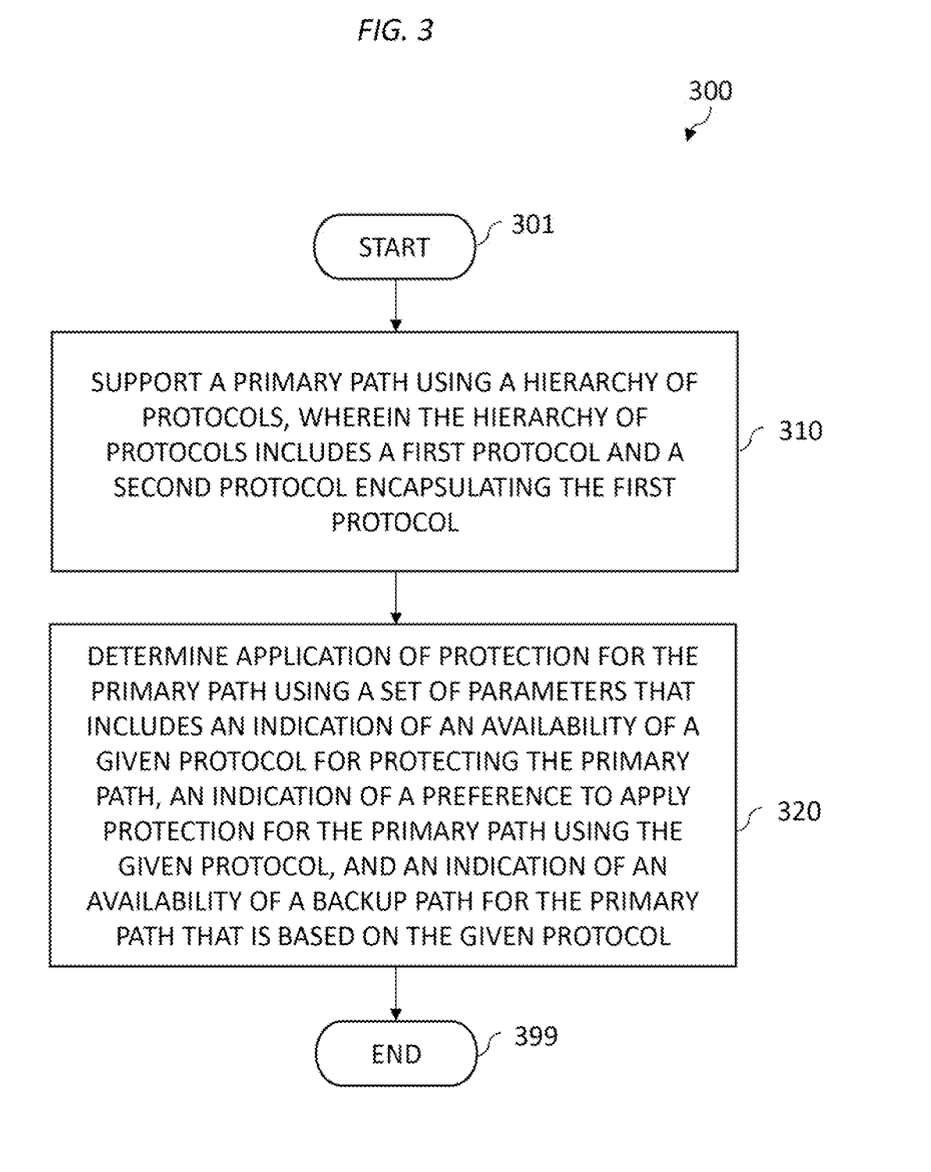
FIG. 3 depicts an example embodiment of a method configured to support selection of protection paths for tunnel-over-tunnel topologies.

FIG. 3 depicts an example embodiment of a method configured to support selection of protection paths for tunnel-over-tunnel topologies. It will be appreciated that, although primarily presented herein as being performed serially, at least a portion of the functions of method 300 may be performed contemporaneously or in a different order than as presented in FIG. 3. At block 301, the method 300 begins. At block 310, support a primary path using a hierarchy of protocols, wherein the hierarchy of protocols includes a first protocol and a second protocol encapsulating the first protocol. At block 320, determine application of protection for the primary path based on evaluation of the hierarchy of protocols for the primary path using a set of parameters that includes an indication of an availability of a given protocol for protecting the primary path, an indication of a preference to apply protection for the primary path using the given protocol, and an indication of an availability of a backup path for the primary path that is based on the given protocol. At block 399, the method 300 ends.

Various example embodiments for providing protection in communication networks may provide various advantages or potential advantages. For example, various example embodiments for providing protection in communication networks may provide a dynamic capability to push protection for a primary path based on a hierarchy of protocols to outer layer protocols in the hierarchy of protocols, rather than statically applying protection for the primary path. For example, various example embodiments for providing protection in communication networks may allow for detailed control by the network operator of a network to select the best option to protect the network by providing resilience at the most appropriate places in the network. For example, various example embodiments for providing protection in communication networks may enable a dynamic selection of protection within the network so that, if a network change occurs, there will still be protection at the next best available level, as long as there is still a backup path available, without any user intervention. For example, various example embodiments for providing protection in communication networks may extend to a scalable configuration that will work for any number of hierarchical levels of protocols. Various example embodiments for providing protection in communication networks may provide various other advantages or potential advantages.

Figure 4:
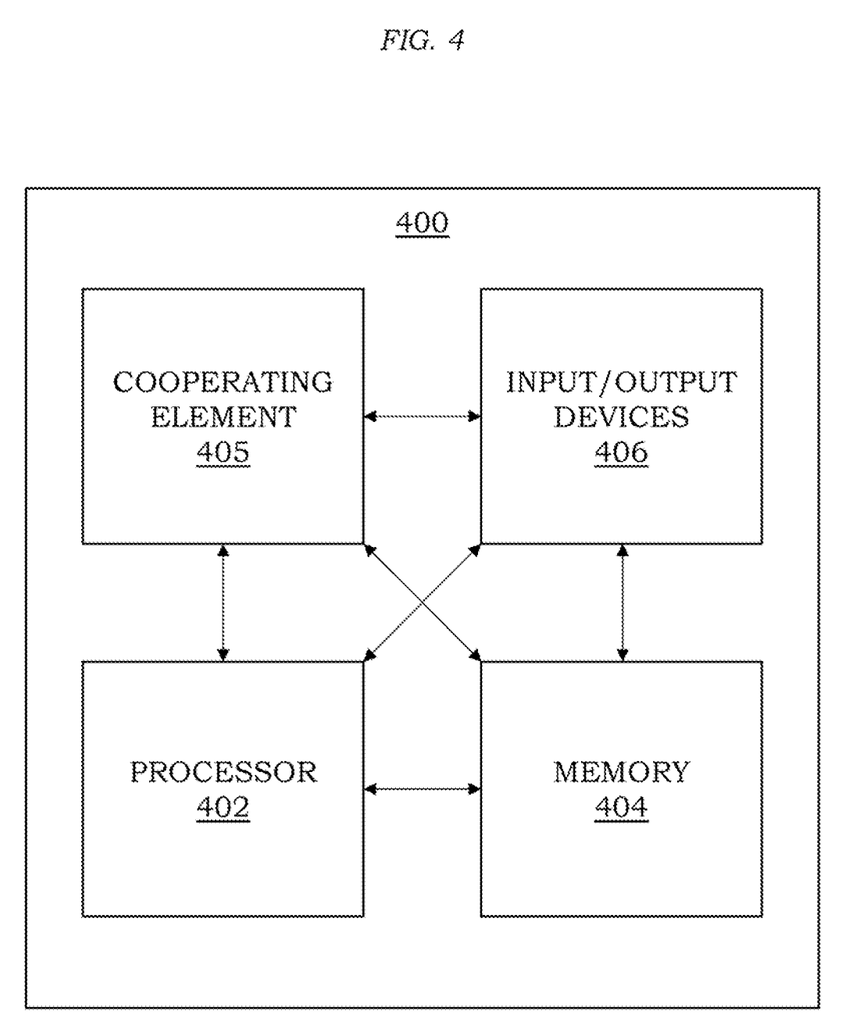
FIG. 4 depicts an example embodiment of a computer suitable for use in performing various functions presented herein.

FIG. 4 depicts an example embodiment of a computer suitable for use in performing various functions presented herein.

The computer 400 includes a processor 402 (e.g., a central processing unit (CPU), a processor, a processor having a set of processor cores, a processor core of a processor, or the like) and a memory 404 (e.g., a random access memory (RAM), a read-only memory (ROM), or the like). In at least some example embodiments, the computer 400 may include at least one processor and at least one memory storing instructions that, when executed by the at least one processor, cause the computer to perform various functions presented herein.

The computer 400 also may include a cooperating element 405. The cooperating element 405 may be a hardware device. The cooperating element 405 may be a process that can be loaded into the memory 404 and executed by the processor 402 to implement various functions presented herein (in which case, for example, the cooperating element 405 (including associated data structures) can be stored on a non-transitory computer readable medium, such as a storage device or other suitable type of storage element (e.g., a magnetic drive, an optical drive, or the like)).

The computer 400 also may include one or more input/output devices 406. The input/output devices 406 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 400 may represent a general architecture and functionality suitable for implementing functional elements described herein, portions of functional elements described herein, or the like, as well as various combinations thereof. For example, computer 400 may provide a general architecture and functionality that is suitable for implementing one or more elements presented herein, such as node or a portion thereof, a controller or a portion thereof, or the like, as well as various combinations thereof It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions which, when executed by the at least one processor, cause the apparatus at least to:
      support a primary path using a hierarchy of protocols, wherein the hierarchy of protocols includes a first protocol and a second protocol encapsulating the first protocol; and
      determine application of protection for the primary path using a set of parameters that includes an indication of an availability of a given protocol for protecting the primary path, an indication of a preference to apply protection for the primary path using the given protocol, and an indication of an availability of a backup path for the primary path that is based on the given protocol, wherein the determination of the application of protection for the primary path results in a determination to apply protection for the primary path using the first protocol based on an indication of a preference to apply protection using the second protocol and an indication that a backup path based on the second protocol is unavailable.

2. The apparatus of claim 1, wherein the application of protection for the primary path is determined based on a request to configure the primary path at a router.

3. The apparatus of claim 1, wherein the application of protection for the primary path is determined based on at least one of an indication of a failure impacting the primary path, an indication of a failure impacting the backup path for the primary path, or a change in availability of the backup path for the primary path.

4. The apparatus of claim 1, wherein the instructions, when executed by the at least one processor, cause the apparatus at least to:

configure a data path of a router to support the primary path and the backup path configured to protect the primary path.

5. The apparatus of claim 1, wherein the instructions, when executed by the at least one processor, cause the apparatus at least to:
 initiate a fast reroute operation to switch from use of the primary path to use of the backup path.

6. The apparatus of claim 1, wherein the primary path is a Multiprotocol Label Switching (MPLS) tunnel-over-tunnel path based on the hierarchy of protocols.

7. An apparatus, comprising:
 at least one processor; and
 at least one memory storing instructions which, when executed by the at least one processor, cause the apparatus at least to:
  support a primary path using a hierarchy of protocols, wherein the hierarchy of protocols includes a first protocol and a second protocol encapsulating the first protocol; and
  determine application of protection for the primary path using a set of parameters that includes an indication of an availability of a given protocol for protecting the primary path, an indication of a preference to apply protection for the primary path using the given protocol, and an indication of an availability of a backup path for the primary path that is based on the given protocol, wherein the determination of the application of protection for the primary path results in a determination to apply protection for the primary path using the first protocol based on an indication for the first protocol not to defer protection to the second protocol and an indication that a backup path based on the first protocol is available.

8. An apparatus, comprising:
 at least one processor; and
 at least one memory storing instructions which, when executed by the at least one processor, cause the apparatus at least to:
  support a primary path using a hierarchy of protocols, wherein the hierarchy of protocols includes a first protocol and a second protocol encapsulating the first protocol; and
  determine application of protection for the primary path using a set of parameters that includes an indication of an availability of a given protocol for protecting the primary path, an indication of a preference to apply protection for the primary path using the given protocol, and an indication of an availability of a backup path for the primary path that is based on the given protocol, wherein the determination of the application of protection for the primary path results in a determination to apply protection for the primary path using the second protocol based on an indication for the first protocol to defer protection to the second protocol and an indication that a backup path based on the second protocol is available.

\* \* \* \* \*